United States Patent

Brunner et al.

[15] 3,664,190
[45] May 23, 1972

[54] FLOW METER DEVICE

[72] Inventors: Richard Brunner, Bound Brook; Roger F. Mahon, New Brunswick, both of N.J.

[73] Assignee: American Standard Inc., New York, N.Y.

[22] Filed: Feb. 19, 1970

[21] Appl. No.: 12,797

[52] U.S. Cl. ................................. 73/194 B, 73/194 E
[51] Int. Cl. .......................................... G01f 1/00
[58] Field of Search ............... 73/194 B, 147, 148, 228; 244/3.3

[56] References Cited

UNITED STATES PATENTS 1,185,735  6/1916  Trood ............................ 73/212 X

OTHER PUBLICATIONS

Mair, W. A., The Effect of a Rear-mounted Disc on the Drag of a Blunt-Based Body of Revolution. From the Aeronautical Quarterly. November 1965. p. 358.

*Primary Examiner*—Jerry W. Myracle
*Attorney*—Sheldon H. Parker, Tennes E. Erstad and Robert G. Crooks

[57] ABSTRACT

The velocity of a flowing fluid is determined by means of an apparatus which includes as its principle elements, an upstream-cylinder-like element, a downstream-disc-like member spaced a short distance from the downstream end of the cylinder-like element, and means responsive to the fluid parameter fluctuations which are produced by the apparatus. The reproducibility of the parameter fluctuation frequency versus flow rate, as well as signal strength fluctuations are improved by a system which involves the stabilization of the fluid flow by means of an asymetric design of the device.

7 Claims, 7 Drawing Figures

PATENTED MAY 23 1972

INVENTORS
Richard Brunner
Roger F. Mahon
BY Sheldon H. Parker
ATTORNEY

FLOW METER DEVICE

BACKGROUND OF THE INVENTION

1. Field of the Invention

This invention relates to fluid flow meters, and more particularly to fluid flow meters which employ an obstruction in the path of the flowing fluid, in order to produce fluid fluctuations which are directly related to various parameters of the fluid, such as the fluid velocity.

2. Description of the Prior Art

It is disclosed in co-pending U.S. patent application, Ser. No. 705,061, filed Feb. 13, 1968, that the velocity of a flowing fluid can be determined by means of a cylindrical body having a curved nose or lead end and a flat base which is connected to a disc of smaller diameter. The disc is coaxial with the cylinder and is spaced axially from the base.

The commercial value of such a device is dependent upon its ability to give strong, clear signals which are linearly related to fluid parameter signals, to be applicable to a variety of fluids and be usable over a large range of flow rates. There is, however, a tendency for such devices to produce signals which are not consistently measurable.

SUMMARY OF THE INVENTION

It has now been found that improved signal quality, greater accuracy and reproducibility can be achieved by means of an asymetric design of the device.

More specifically, it has now been found, that in flow meters which produce fluid oscillations by means of a generator which includes an upstream obstruction member and a downstream planar member, an asymetric relationship is established between the flowing fluid and the meter.

BRIEF DESCRIPTION OF THE DRAWINGS

The objects, features and advantages of the present invention will become apparent and will be fully understood as the description of the invention proceeds, particularly when taken together with the accompanying drawings wherein like reference numerals indicate similar parts in the drawings, and wherein.

DESCRIPTION OF THE PREFERRED EMBODIMENTS

Figure 1:
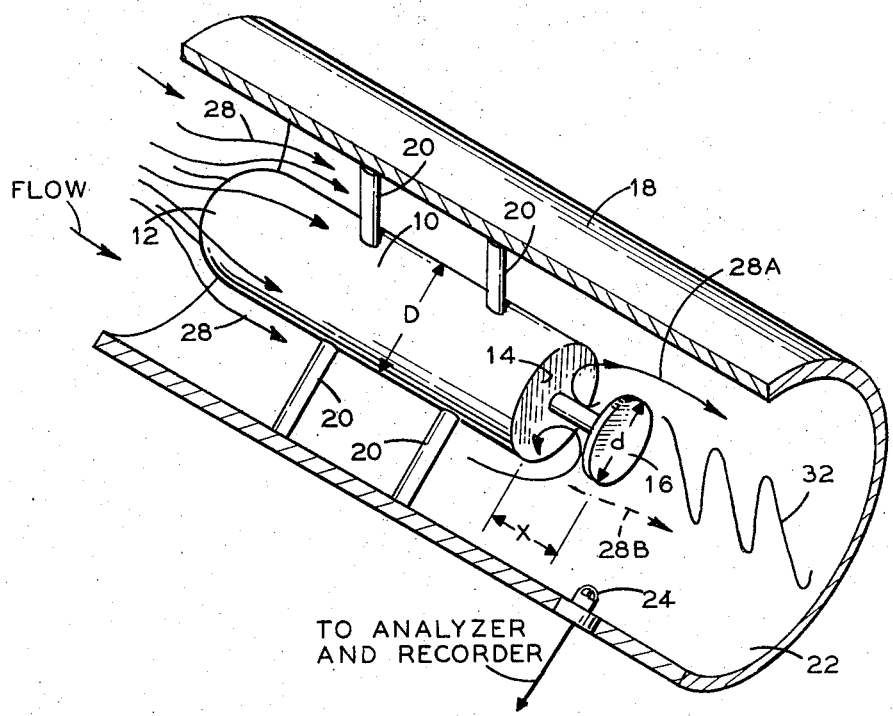
FIG. 1 is a perspective view of the structure of the present invention.

Referring now to FIG. 1, the apparatus illustrated therein includes a streamlined cylindrical body 10 having a curved nose 12 and a flat base 14 at its opposite end. Attached to the base 14 is a flat disc 16 of smaller diameter $d$ as compared to the diameter D of the cylindrical body 10. The center of the disc is coincident with the longitudinal central axis of the body 10 and the disc is spaced axially from the base 14 by the distance $x$.

The streamlined body 10 and attached disc 16 are suspended at the center of a tube 18 by three pairs of thin struts 20 connecting the exterior surface of the body 10 to the interior wall of the tube 18. As illustrated, the struts of each pair are aligned in a plane passing through the central longitudinal axis of the body 10 and the three planes of three pairs of aligned struts are spaced apart angularly by 120°. The streamlined nose 12 is oriented to face a source of fluid flow and is pointed upstream with respect to the fluid flow, the disc 16 is located downstream near the exit end 22 of the tube 18, and the longitudinal axis of the body 10 is substantially parallel to the mean axial fluid flow within the tube 18. Within the tube 18 is a sensor 24 the output of which is fed to a conventional analyzer and recorder (not shown) which analyzes and records the velocity or pressure changes detected by the sensor 24.

Referring now to FIG. 1 when a fluid such as air flows into the tube 18, the flow impinges upon the curved nose 12 of the body 10 and is divided as shown by arrows 28 to flow around and by the obstruction constituted by the body 10.

The boundary layer which develops along the nose 12, expands along the body 10 and detaches from the base 14 in a generally "V" shaped wake pattern. It is critical that the inwardly flowing portion of the detached boundary layer interact, that is, be intersected by the disc 16.

While the theory behind the invention is not clearly defined, and should not be interpreted as being a limitation of the invention, an explanation of the probable reasons underlying the basic phenomenon is nevertheless believed to contribute to the understanding of the invention.

It appears that the fluid flow as indicated by the arrows 28, consists initially of a laminar boundary layer which changes to a turbulent layer after flowing some distance along the surface of the body 10. The boundary layer thickness, that is, the portion of the fluid along surface of the body member 10, is relatively independent of the diameter of the body member 10.

If the laminar boundary layer is not turbulent at the base 14, the change in fluid flow past the base 14 will be such that the flow will not be intersected by the disc 16. When the device is properly designed, the flow alternately flows past disc 16 at one side as indicated by arrows 28a and then the other side as indicated by arrows 28b.

The alternate "shedding" past one side of the disc 16 and then the other side of the disc creates what appears to be an oscillatory flow. With simply a circular base 14 and a circular disc 16, the shedding from the disc, although fixed at a constant frequency for a given flow, has no preferred orientation. It occurs, therefore, in a random fashion about the circumference of the disc. Such a fluid signal cannot be properly detected by the sensor 24 which has a fixed location.

The oscillatory flow of the fluid in the downstream wake represented by trace 32 must be stabilized in a fixed plane aligned perpendicular to the plane of the disc 16. Under these conditions, the sensor 24 will detect fluid oscillations stabilized with respect to the sensor which results in a signal from the sensor of large amplitude and having good quality, i.e., good signal to noise ratio. The frequency of the stabilized oscillations detected by the sensor is in direct correlation with the mean axial velocity of fluid flow within the tube 18, and, therefore, the velocity of the fluid flow can be readily measured with high precision.

Figure 2:
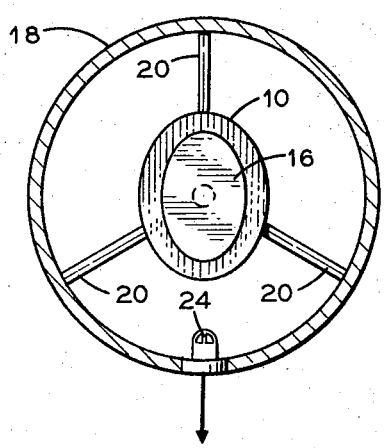
FIG. 2 is an end view looking upstream of the structure in accordance with the principles of the invention.

The stabilization of the oscillations in a fixed plane can be achieved by making the cylinder body 10, and disc 16, oval in configuration, as illustrated in FIG. 2.

It is not critical that the entire length of the cylinder body 10, be oval or non-circular, but at least a substantial region of the body, near the base end 14, must be non-circular.

Figure 3:
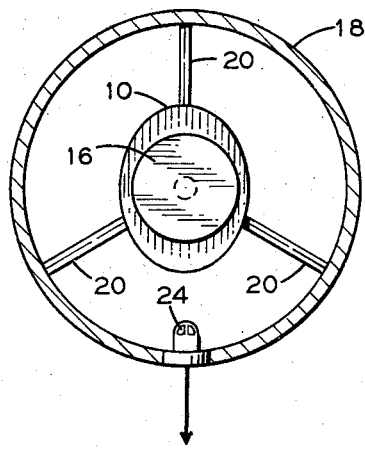
FIG. 3 is an end view looking upstream of a modification of the structure of FIG. 2.

As seen in FIG. 3, the disc can be circular, while the base portion of the cylinder 10 is oval, provided the diameter of the disc is less than the maximum diameter of the cylinder 10. Preferably, the disc diameter is less than the minimum diameter of the cylinder at its base end 14.

Figure 4:
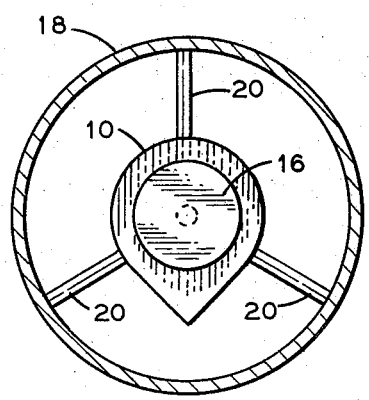
FIG. 4 is an end view looking upstream of a further modification of the invention.

As seen in FIG. 4, the cross-section of the cylinder need not be truly oval, but rather the regions which deviate from a circular cross-section can be somewhat pointed.

Figure 5:
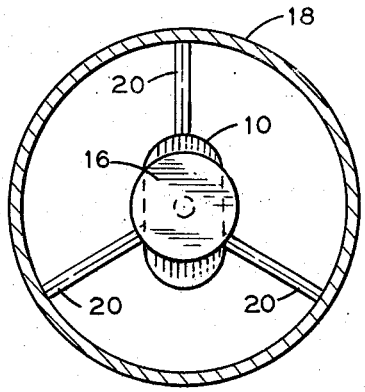
FIG. 5 is an end view looking upstream of a still further modification of a structure in accordance with the principle of the invention.

The disc 16, must have a diameter which is less than the diameter of the cylinder, but can also have a region, which exceeds the diameter of the cylinder body, as shown in FIG. 5.

A further method of stabilizing the oscillation is achieved by locating the cylinder eccentrically with respect to the tube or conduit 18.

The critical factor which controls the stabilization of the oscillation, is the establishment of a predetermined pressure differential in the system, such that a preferred (constant) plane of oscillation is established.

Figure 6:
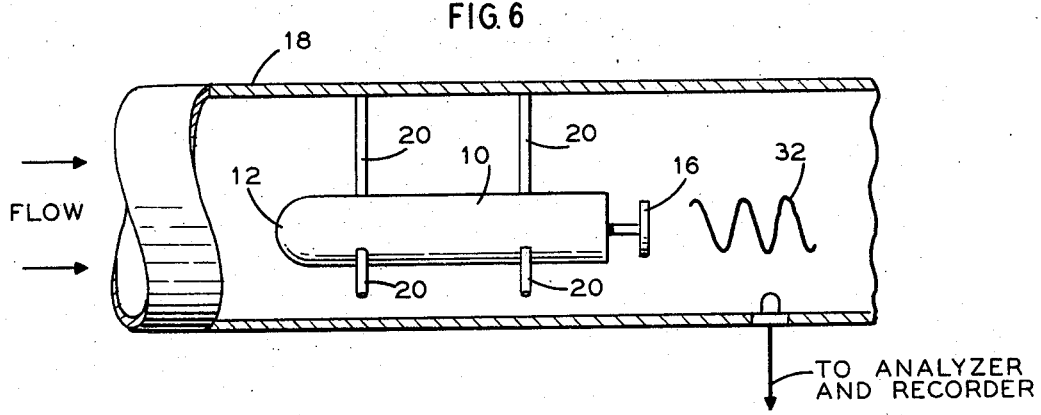
FIG. 6 is a side elevational view, partly in section, of a cylinder-disc device asymetrically oriented in a conduit in accordance with the principles of the invention.

Referring to the structure illustrated in FIG. 6, the off-set position of the body 10 and disc 16 combination relative to the tube 18 stabilizes the plane of the oscillatory flow produced. The longitudinal axis of the cylindrical body 10 is displaced from and parallel with the longitudinal axis of the tube 18. The off setting of the axis relative to each other helps to produce asymetrical flow patterns in the region around the sensor 24, the plane of the oscillatory flow being oriented to a constant preferred plane.

Continuing, an additional embodiment in accordance with the principles of this invention is where the various combinations of shapes of the cylinder 10 and disc 16 are reversed relative to each other. For example, the cylindrical body 10 can be circular in cross-section, and the disc can be non-circular or oval in shape.

Figure 7:
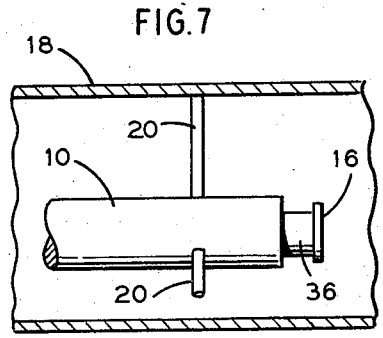
FIG. 7 is a view of still another embodiment of structure in accordance with the principles of the invention.

A further embodiment in accordance with the principles of this invention is the placing of an asymetrically shaped flow-distrubing member between the base of the body 10 and the disc 16. Referring to FIG. 7, there is illustrated a flow-disturbing member 36 which is positioned between the body 10 and the disc 16. The flow-disturbing member 36 can be, for example, either eliptical or oval in cross-section. The member 36 not only helps to stabilize the plane of oscillation of the wave generated, but also tends to decrease the Strouhal number. In this embodiment, the body 10 and disc 16 can be aligned with and positioned along the longitudinal axis of the tube 18; or the body 10 and disc 16 can be positioned eccentrically with respect to the tube 18 as illustrated in FIG. 7.

What is claimed is:

1. In a fluid flowmeter comprising a conduit for the flowing fluid; an immovable streamlined wake-forming member suspended within the conduit in spaced relation to the conduit side walls; a wake-intersecting member spaced behind the first-mentioned member for generating fluid oscillations therebeyond; and sensor means responding to the generated oscillations to produce a signal related to the oscillation frequency: the improvement wherein one of said members is of non-circular cross section in planes normal to the direction of fluid flow to introduce a flow non-symmetry sufficient to stabilize the oscillations in a predetermined longitudinal plane; and said sensor means being located to effectively respond to the oscillations in the stabilized plane.

2. In the flowmeter of claim 1: the further improvement wherein the wake-forming member has a circular flow-normal cross section, and the wake-intersecting member has a non-circular flow-normal cross section.

3. In the flowmeter of claim 1: the further improvement wherein the wake-forming member has a non-circular flow-normal cross section, and the wake-intersecting member has a circular flow-normal cross section.

4. In the fluid flowmeter of claim 1: the further improvement wherein the wake-forming member is of generally bullet-like configuration, and the wake-intersecting member is a flat disc.

5. In a fluid flowmeter comprising a conduit for the flowing fluid; an immovable streamlined wake-forming member suspended within the conduit in spaced relation to the conduit side walls; a wake-intersecting member spaced behind the first-mentioned member for generating fluid oscillations therebeyond; and sensor means responding to the generated oscillations to produce a signal related to the oscillation frequency: the improvement wherein the wake-forming member and wake-intersecting member are located eccentrically within the conduit to introduce a flow non-symmetry sufficient to stabilize the oscillations in a predetermined longitudinal plane; and said sensor means being located to effectively respond to the oscillations in the stabilized plane.

6. In a fluid flowmeter comprising a conduit for the flowing fluid; an immovable streamlined wake-forming member suspended within the conduit in spaced relation to the conduit side walls; a wake-intersecting member spaced behind the first-mentioned member for generating fluid oscillations therebeyond; and sensor means responding to the generated oscillations to produce a signal related to the oscillation frequency: the improvement wherein an asymetrically cross-sectioned flow disturber is interposed between the wake-forming member and the wake-intersecting member; said flow-disturber having a lesser flow-normal dimension than the wake-intersecting member so that the produced disturbance introduces a non-symmetry in the wake sufficient to stabilize the oscillations in a predetermined longitudinal plane; and said sensor means being located to effectively respond to the oscillations in the stabilized plane.

7. In the flowmeter of clam 6: the further improvement wherein the flow disturber has oval flow-normal dimension.

* * * * *